(12) United States Patent
Choho

(10) Patent No.: US 10,209,664 B2
(45) Date of Patent: Feb. 19, 2019

(54) PRINTING SYSTEM INCLUDING PRINTING APPARATUS AND PRINTING CONTROL APPARATUS

(71) Applicant: CANON KABUSHIKI KAISHA, Tokyo (JP)

(72) Inventor: Satoshi Choho, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/943,412

(22) Filed: Apr. 2, 2018

(65) Prior Publication Data

US 2018/0224795 A1    Aug. 9, 2018

Related U.S. Application Data

(63) Continuation of application No. 14/794,672, filed on Jul. 8, 2015, now Pat. No. 9,952,550.

(30) Foreign Application Priority Data

Jul. 11, 2014    (JP) .................................. 2014-143519

(51) Int. Cl.
*G03G 15/00*    (2006.01)
*G06F 3/12*    (2006.01)
*H04N 1/00*    (2006.01)

(52) U.S. Cl.
CPC ........... *G03G 15/80* (2013.01); *G06F 1/3284* (2013.01); *G06F 3/1221* (2013.01);
(Continued)

(58) Field of Classification Search
None
See application file for complete search history.

(56) References Cited

U.S. PATENT DOCUMENTS 5,293,196 A *  3/1994 Kaneko ............. G03G 15/5075
                                                          358/400
5,867,718 A *  2/1999 Intrater ..................... G06F 1/26
                                                          713/323
(Continued)

FOREIGN PATENT DOCUMENTS

JP    2006224595 A  *  8/2006
JP    2008158194 A  *  7/2008  ......... G03G 15/5012
(Continued)

*Primary Examiner* — Sevan A Aydin
(74) *Attorney, Agent, or Firm* — Canon U.S.A., Inc. IP Division

(57) ABSTRACT

A printing system includes a printing control apparatus and a printing apparatus. The printing apparatus includes a receiving unit that receives data transmitted from the printing control apparatus, and a power source control unit that causes the printing apparatus to enter a first power saving state or a second power saving state. The printing control apparatus includes an acquisition unit that acquires a power state of the printing apparatus, and a control unit that causes the printing control apparatus to enter an OFF state in a case where a acquired power state is the first power saving state, and causes the printing control apparatus to enter a power saving state where a wake-up packet for recovering the printing apparatus from the second power saving state can be transmitted in a case where the acquired power state is the second power saving state.

51 Claims, 15 Drawing Sheets

(52) U.S. Cl.
CPC .......... *G06F 3/1229* (2013.01); *G06F 3/1285* (2013.01); *H04N 1/00896* (2013.01); *Y02D 10/1592* (2018.01)

(56) References Cited

U.S. PATENT DOCUMENTS

| | | | | |
|---|---|---|---|---|
| 6,760,850 | B1* | 7/2004 | Atkinson | G06F 1/24 713/300 |
| 8,032,773 | B2* | 10/2011 | Kim | G06F 1/3203 713/321 |
| 8,427,665 | B2* | 4/2013 | Negishi | G06F 3/1221 358/1.14 |
| 2002/0035702 | A1* | 3/2002 | Chu | G06F 1/3209 713/323 |
| 2004/0208667 | A1* | 10/2004 | Nakaya | G03G 15/80 399/88 |
| 2007/0183807 | A1* | 8/2007 | Park | G06F 1/3215 399/88 |
| 2008/0010477 | A1* | 1/2008 | Nakamura | H04N 1/00885 713/323 |
| 2009/0136243 | A1* | 5/2009 | Tanaka | G03G 15/5008 399/21 |
| 2011/0058822 | A1* | 3/2011 | Shioyasu | H04N 1/00347 399/8 |
| 2011/0182208 | A1* | 7/2011 | Shima | G06F 1/266 370/254 |
| 2013/0209132 | A1* | 8/2013 | Soda | G03G 15/5004 399/75 |
| 2013/0215466 | A1 | 8/2013 | Ooba | |
| 2014/0006828 | A1 | 1/2014 | Kanematsu | |
| 2015/0003856 | A1* | 1/2015 | Umimura | G03G 15/80 399/88 |

FOREIGN PATENT DOCUMENTS

| | | | | |
|---|---|---|---|---|
| JP | 2009113451 A | * | 5/2009 | ............. G03G 15/00 |
| JP | 05245561 B2 | | 7/2013 | |
| JP | 2014048905 A | | 3/2014 | |

* cited by examiner

FIG.11

QUICK START WHEN POWER SWITCH IS TURNED ON

| ON | OFF |

(WHEN ON IS SELECTED, STANDBY POWER IS CONSUMED EVEN AFTER POWER SWITCH IS TURNED OFF)

FIG.14

POWER ASSOCIATION FOR PRINTING CONTROL APPARATUS

ON     OFF (WHEN POWER ASSOCIATION IS ON, TURNING OFF POWER SWITCH CHANGES POWER STATES OF PRINTING APPARATUS AND PRINTING CONTROL APPARATUS IN ASSOCIATIVE WAY)

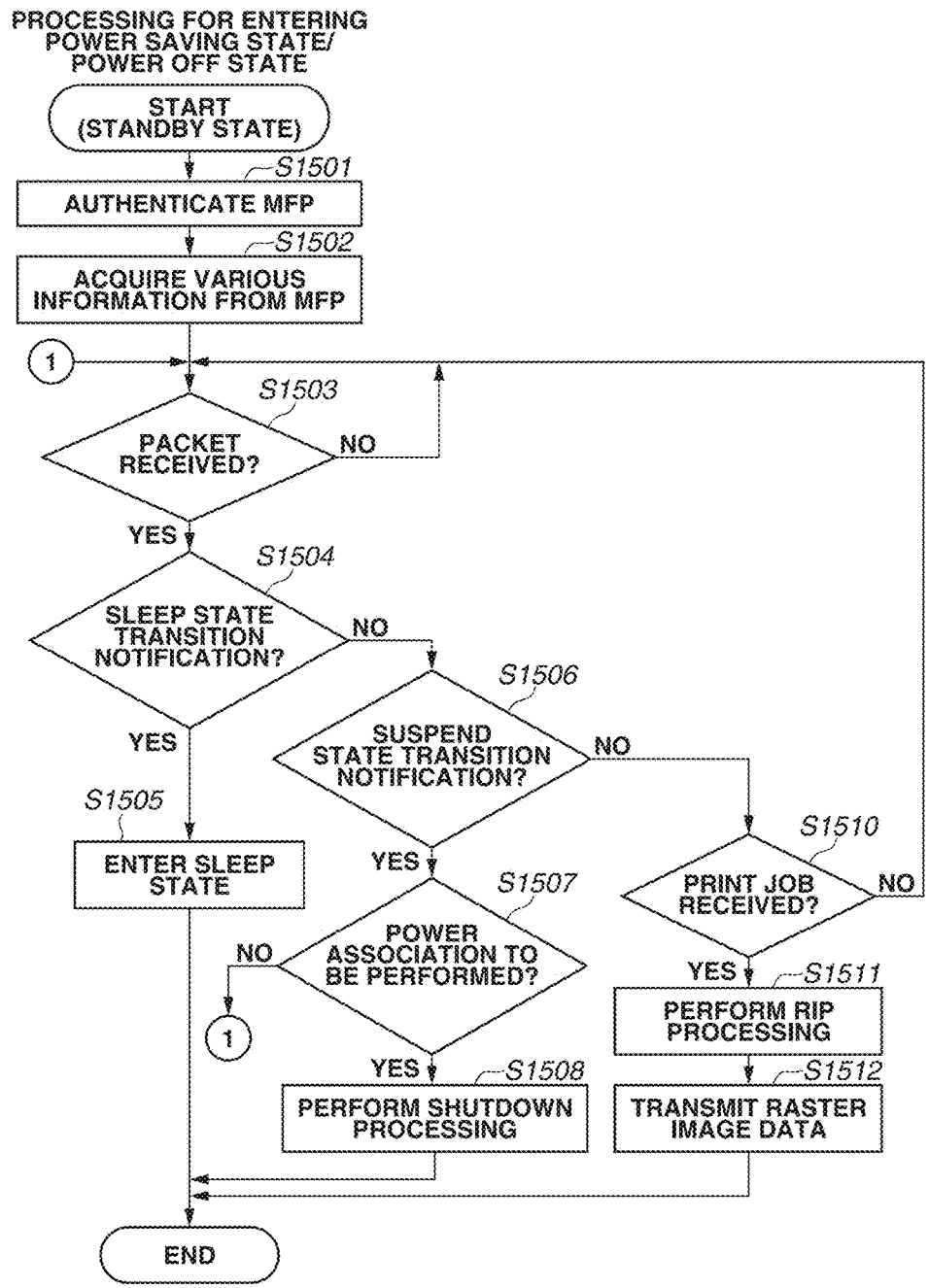

PRINTING SYSTEM INCLUDING PRINTING APPARATUS AND PRINTING CONTROL APPARATUS

CROSS-REFERENCE TO RELATED APPLICATIONS

This application is a Continuation, and claims the benefit, of U.S. patent application Ser. No. 14/794,672 filed Jul. 8, 2015 (now U.S. Pat. No. 9,952,550 B2), which claims priority from Japanese Patent Application No. 2014-143519 filed Jul. 11, 2014. Each of U.S. patent application Ser. No. 14/794,672 and Japanese Patent Application No. 2014-143519 is hereby incorporated by reference herein in its entirety.

BACKGROUND OF THE INVENTION

Field of the Invention

The present invention relates to a printing system including a printing apparatus and a printing control apparatus of which the power state changes in association with the power state of the printing apparatus.

Description of the Related Art

A known printing system includes a printing control apparatus for receiving a print job from an external apparatus and generating raster image data according to the print job, and a printing apparatus for performing printing by using the raster image data received from the printing control apparatus (refer to Japanese Patent Application Laid-Open No. 2003-72198).

The printing apparatus discussed in Japanese Patent Application Laid-Open No. 2003-72198 includes a video interface circuit for receiving the raster image data transmitted from the printing control apparatus, and a network (N/W) interface circuit for receiving control information transmitted from the printing control apparatus. The above-described control information includes, for example, commands for performing printing by using raster image data.

The printing apparatus enters a power saving state when a certain condition is satisfied, for example, when the printing apparatus has not been operated for a predetermined time period. In the power saving state, the power supply to the N/W interface circuit is maintained but the power supply to the video interface circuit is suspended to reduce power consumption of an image forming apparatus.

As discussed in Japanese Patent Application Laid-Open No. 2003-72198, various power saving techniques for the printing apparatus have conventionally been proposed. Further, with the trend for energy saving in recent years, demands for power saving measures on printing apparatuses are increasing. In Europe, for example, energy-using products need to conform to the "EU Directive on Eco-Design of Energy-using Products (EuP Directive)" Lot 6 standard. To satisfy the Lot 6 standard, when no operation is made to a product for a predetermined time period, the product needs to automatically enter a state where power consumption is 0.5 w or below.

To achieve the state where power consumption is 0.5 w or below, a known technique causes a printing apparatus to enter a suspend state or a hibernation state. The suspend state is a state where the power supply to the main memory of the printing apparatus is maintained but the power supply to units other than the main memory is suspended. When the printing apparatus recovers from the suspend state, the printing apparatus can utilize working statuses stored in the main memory. Therefore, the printing apparatus can start more quickly than in normal start where applications and an operating system (OS) are activated. The hibernation state is a state where working statuses on the main memory of the printing apparatus are copied to a hard disk drive and the power supply to each unit (including the hard disk drive) of the printing apparatus is suspended. When the printing apparatus recovers from the hibernation state, the printing apparatus can utilize working statuses stored in the hard disk drive. Therefore, the printing apparatus can start more quickly than in normal start where applications and an OS are activated. The hibernation state suspends the power supply even to the main memory and therefore provides smaller power consumption than the suspend state. However, the hibernation state necessitates reading working statuses copied to the hard disk drive and therefore provides slower start than the suspend state.

In recent years, to achieve power saving for the entire printing system, power saving measures for the printing control apparatus have been taken in addition to the above-described power saving measures for the printing apparatus.

SUMMARY OF THE INVENTION

However, in some cases, when the printing apparatus enters the above-described suspend state or hibernation state (hereinafter referred to as a first power saving state), the entire printing system may wastefully consume power even if the printing control apparatus enters a power saving state. The reason of wasteful power consumption will be described below. When the printing apparatus is in the suspend state or the hibernation state, the power supply to the interface for receiving data from an external apparatus is suspended. In this case, even if the printing control apparatus receives a print job from an external apparatus, the printing apparatus cannot receive raster image data generated by the printing control apparatus. Thus, when the printing apparatus is in the power saving state where data cannot be received from the printing control apparatus, operating the printing control apparatus for transmitting data to the printing apparatus in the power saving state will wastefully consume power.

On the other hand, the printing apparatus can enter not only the above-described suspend state and hibernation state but also a sleep state (hereinafter referred to as a second power saving state) where power is supplied to minimally necessary units such as an interface for receiving data from the printing control apparatus. When the printing apparatus is in the sleep state, the printing apparatus can recover from the sleep state upon reception of raster image data transmitted from the printing control apparatus. More specifically, when the printing apparatus is in the sleep state, it is desirable to maintain the printing control apparatus in operation in order to recover the printing apparatus from the sleep state upon data transmission from the printing control apparatus. However, simply maintaining the printing control apparatus in operation will result in an increase in power consumption as the entire printing system.

The present invention is directed to reducing power consumption in a printing system including a printing apparatus and a printing control apparatus.

According to an aspect of the present invention, a printing system includes a printing control apparatus for generating raster image data according to a print job received from an external apparatus, and a printing apparatus connected to the printing control apparatus to perform printing by using the raster image data transmitted from the printing control apparatus. The printing apparatus includes a receiving unit configured to receive data transmitted from the printing control apparatus, and a power source control unit configured to cause the printing apparatus to enter a first power saving state where a power supply to the receiving unit is suspended or a second power saving state where power is supplied to the receiving unit. The printing control apparatus includes an acquisition unit configured to acquire a power state of the printing apparatus, and a control unit configured to cause the printing control apparatus to enter an OFF state in a case where the power state of the printing apparatus acquired by the acquisition unit is the first power saving state, and to cause the printing control apparatus to enter a power saving state where a wake-up packet for recovering the printing apparatus from the second power saving state can be transmitted in a case where the power state of the printing apparatus acquired by the acquisition unit is the second power saving state.

Further features of the present invention will become apparent from the following description of exemplary embodiments with reference to the attached drawings.

BRIEF DESCRIPTION OF THE DRAWINGS

FIG. 11 illustrates a screen for selecting whether quick start is enabled or disabled.

FIG. 14 illustrates a screen for selecting whether the power states of the printing apparatus and the printing control apparatus are to be changed in an associative way.

FIG. 15 is a flowchart illustrating processing performed by a printing control apparatus according to a third exemplary embodiment.

DESCRIPTION OF THE EMBODIMENTS

<Overall Configuration of Image Forming System>

Figure 1:
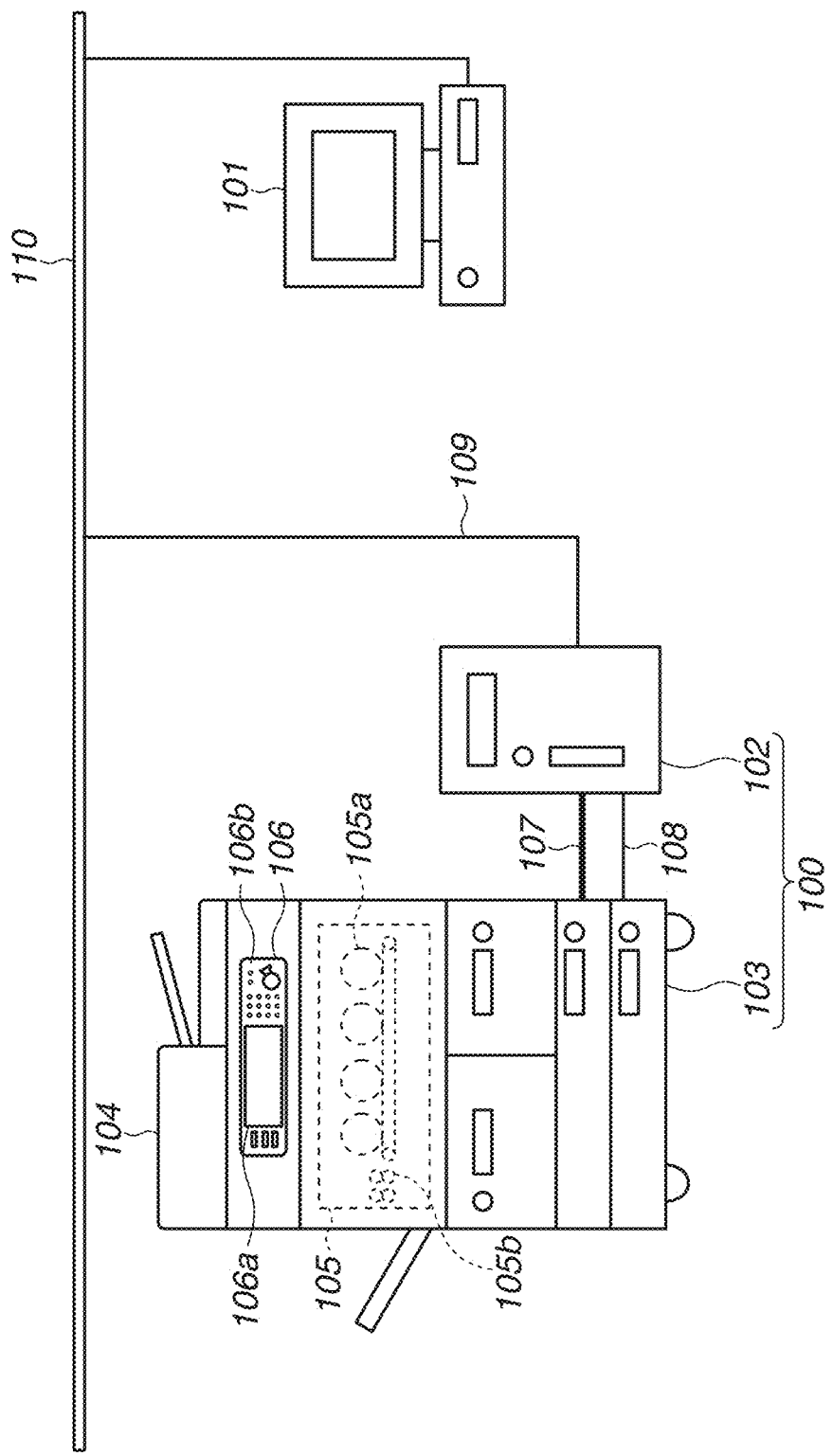
FIG. 1 is a block diagram illustrating an overall configuration of a printing system.

A first exemplary embodiment will be described below. FIG. 1 is a block diagram illustrating an overall configuration of a printing system 100.

The printing system 100 includes a printing control apparatus 102 and a printing apparatus 103 configured separately from the printing control apparatus 102. The printing system 100 is communicably connected with a client computer 101. The client computer 101 and the printing control apparatus 102 are communicably connected via a local area network (LAN) 110. The printing control apparatus 102 and the LAN 110 are connected via an Ethernet (registered trademark) cable 109. Further, the printing control apparatus 102 and the printing apparatus 103 are connected via a video cable 107 and a control cable 108. Although, in the present exemplary embodiment, the printing apparatus 103 is not directly connected to the LAN 110, the printing apparatus 103 may be directly connected to the LAN 110.

The client computer 101 generates a print job by using a printer driver and transmits the generated print job to the printing control apparatus 102. This print job includes page description language (PDL) data described with the PDL. Print jobs are not limited to PDL data, and may be image data according to Joint Photographic Experts Group (JPEG) and other predetermined compression methods and bit map data.

The printing control apparatus 102 interprets a print job transmitted from the client computer 101 to generate raster image data. Then, the printing control apparatus 102 transmits to the printing apparatus 103 the generated raster image data and control commands for causing the printing apparatus 103 to perform printing by using the raster image data. The raster image data is transmitted to the printing apparatus 103 via the video cable 107. Control commands (a command for giving an instruction to start printing, and a command for specifying sheet feed stages, the number of copies, and print layout, etc.) are transmitted to the printing apparatus 103 via the control cable 108.

The printing apparatus 103 performs printing by using raster image data according to control commands transmitted from the printing control apparatus 102. The printing apparatus 103 according to the present exemplary embodiment is a multifunction peripheral (MFP) having various functions including a print function, a scan function, a copy function, a BOX function, and a SEND function. Further, the printing apparatus 103 may have a bookbinding function and a staple function.

As illustrated in FIG. 1, the printing apparatus 103 includes a scanner unit 104, a printer unit 105, and an operation unit 106. The scanner unit 104 reads an image of a document placed on a document positioning plate to generate image data corresponding to the relevant image. The printer unit 105 performs printing based on raster image data. The printer unit 105 includes an electrophotographic print mechanism. This print mechanism includes photosensitive drums 105a, an exposure unit (not illustrated) for forming electrostatic latent images on the photosensitive drums 105a, development units (not illustrated) for developing the electrostatic latent images by using toner, and a fixing unit 105b for fixing the toner image transferred onto a print sheet. The operation unit 106 includes a display unit 106a and an input unit 106b. The display unit 106a is, for example, a liquid crystal display (LCD). The input unit 106b includes, for example, a power saving button 106c, a touch panel, and other various buttons.

Figure 2:
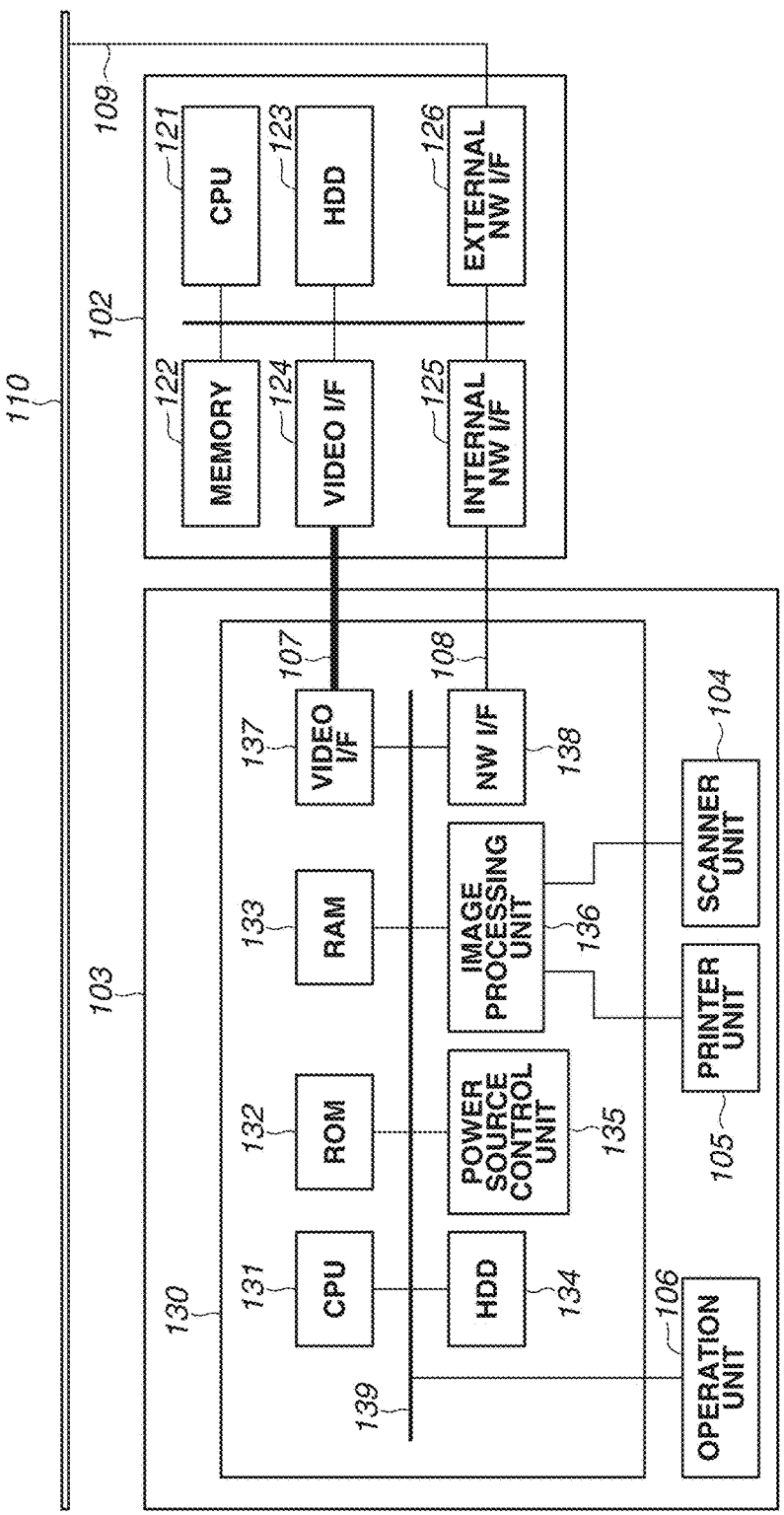
FIG. 2 is a hardware block diagram illustrating a printing apparatus and a printing control apparatus.

FIG. 2 is a hardware block diagram illustrating the printing apparatus 103 and the printing control apparatus 102.

A controller 130 of the printing apparatus 103 will be described in detail below with reference to FIG. 2. The controller 130 performs overall operation control, state management, and image processing on the entire printing apparatus 103. For example, the controller 130 controls operations of the operation unit 106, the scanner unit 104, and the printer unit 105.

The controller 130 includes a central processing unit (CPU) 131, a read only memory (ROM) 132, a random access memory (RAM) (main memory) 133, a hard disk drive (HDD) 134, a power source control unit 135, and an image processing unit 136. The controller 130 further includes a video interface (video I/F) 137, a network interface (network I/F) 138, and a system bus 139.

The CPU 131 executes a program stored in storage units (the ROM 132 and the HDD 134) to control each unit of the printing apparatus 103. The RAM 133 is used as a work memory for the CPU 131. The HDD 134 is a mass-storage device unit for storing various control programs to be executed by the CPU 131, and image data. The image processing unit 136 is connected to the scanner unit 104 and the printer unit 105 via image signal lines. The video I/F 137 is connected to the printing control apparatus 102 via the video cable 107. The network I/F 138 is connected to the printing control apparatus 102 via the control cable 108. The video I/F 137 transmits raster image data to the printing control apparatus 102 via the video cable 107. The network I/F 138 transmits control commands to the printing control apparatus 102 via the control cable 108. The power source control unit 135 performs control to start and suspend the power supply to each unit of the printing apparatus 103.

The printing control apparatus 102 will be described in detail below with reference to FIG. 2.

The printing control apparatus 102 includes a CPU 121, a memory 122, a HDD 123, a video I/F 124, a network I/F 125, and a network I/F 126. Hereinafter, the network I/F 125 for communicating with the printing apparatus 103 is referred to as an internal network I/F 125, and the network I/F 126 for communicating with the client computer 101 is referred to as an external network I/F 126.

The CPU 121 executes a program stored in a storage unit (the memory 122 and the HDD 123) to control each unit of the printing control apparatus 102. The memory 122 is used as a work memory for the CPU 131. The HDD 123 is mass-storage device unit for storing various control programs to be executed by the CPU 121, and image data. The video I/F 124 is connected to the printing apparatus 103 via the video cable 107. The internal network I/F 125 is connected to the printing apparatus 103 via the control cable 108. The external network I/F 126 is connected to the LAN 110 via the Ethernet (registered trademark) cable 109.

Figure 3:
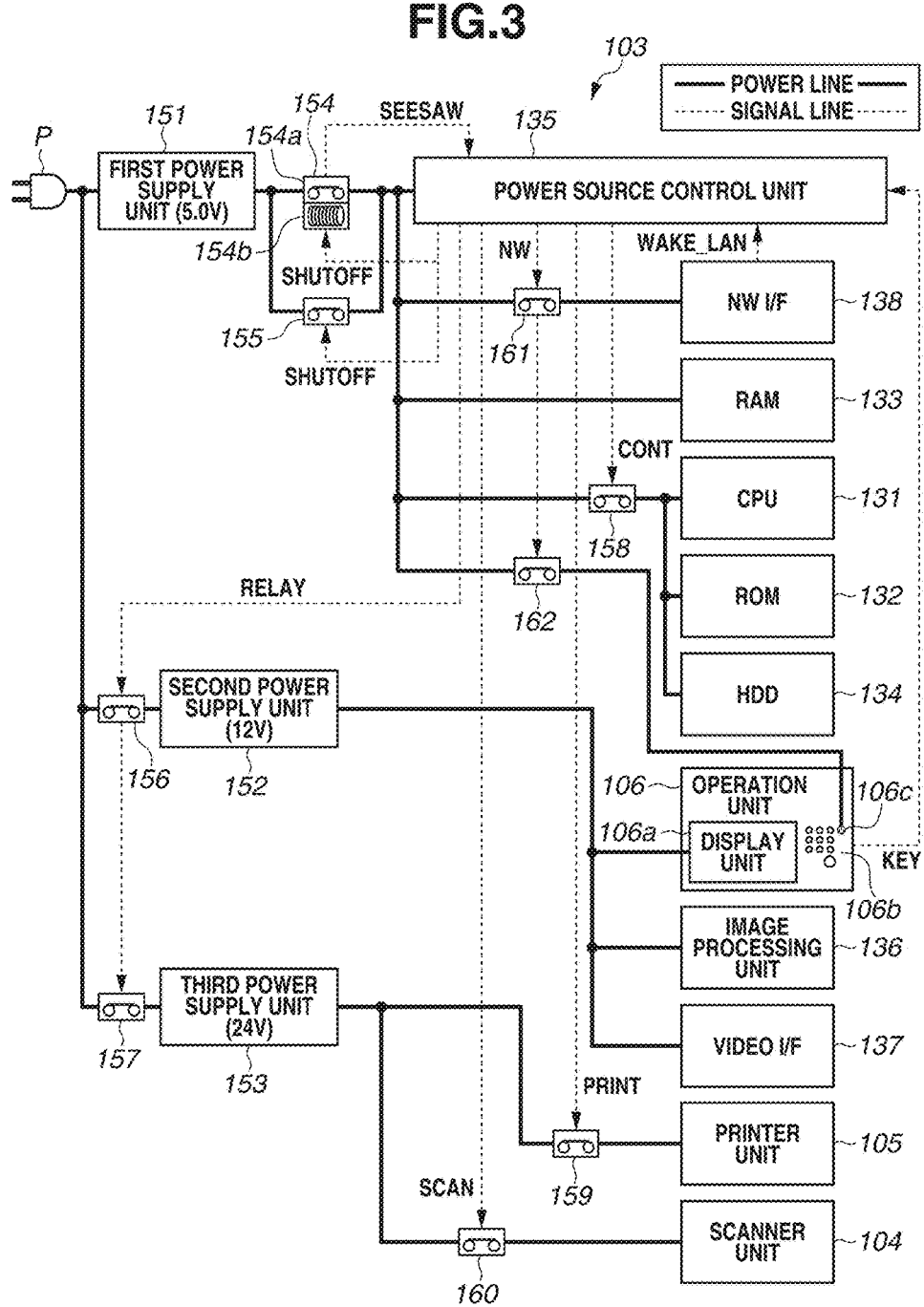
FIG. 3 is a block diagram illustrating a power source system of the printing apparatus.

FIG. 3 is a block diagram illustrating a power source system of the printing apparatus 103.

The power source system of the printing apparatus 103 will be described in detail below with reference to FIG. 3.

The printing apparatus 103 includes a first power supply unit 151, a second power supply unit 152, and a third power supply unit 153. The first power supply unit 151 generates direct current (DC) power of about 5.0V based on alternating current (AC) power supplied via a plug P. The first power supply unit 151 supplies the generated DC power to the network I/F 138, the CPU 131, the RAM 133, the ROM 132, the HDD 134, the power source control unit 135, and the power saving button 106c on the operation unit 106. Hereinafter, devices supplied with power from the first power supply unit 151 are referred to as first power source system devices.

The second power supply unit 152 generates DC power of about 12.0V based on AC power supplied via the plug P. The second power supply unit 152 supplies the generated DC power to the display unit 106b, the image processing unit 136, and the video I/F 137. Hereinafter, devices supplied with power from the second power supply unit 152 are referred to as second power source system devices.

The third power supply unit 153 generates DC power of about 24.0V based on AC power supplied via the plug P. The third power supply unit 153 supplies the generated DC power to the printer unit 105 and the scanner unit 104. Hereinafter, devices supplied with power from the third power supply unit 153 are referred to as third power source system devices.

Between the first power supply unit 151 and the first power source system devices, there is provided a power switch 154 which is turned ON or OFF according to a user operation. The power switch 154 includes a seesaw switch 154a which is turned ON or OFF according to a user operation and a solenoid 154b for turning OFF the seesaw switch 154a.

In parallel with the power switch 154, there is provided a relay switch 155 for supplying the power generated by the first power supply unit 151 to the first power source system devices. Even if the power switch 154 is turned OFF by a user operation, power is supplied from the first power supply unit 151 to the first power source system devices via the relay switch 155. The power source control unit 135 is notified that the power switch 154 has been turned OFF, via a signal SEESAW. When the power switch 154 is turned OFF, the power source control unit 135 instructs the CPU 131 to perform shutdown processing. When the shutdown processing is performed by the CPU 131, the power source control unit 135 turns OFF the relay switch 155 via a signal SHUTOFF. Accordingly, the printing apparatus 103 enters the power OFF state.

Between the plug P and the second power supply unit 152, there is provided a relay switch 156 for starting and suspending the power supply from the plug P to the second power supply unit 152. Between the plug P and the third power supply unit 153, there is provided a relay switch 157 for starting and suspending the power supply from the plug P to the third power supply unit 153.

Between some units of the controller 130 (the CPU 131, the ROM 132, and the HDD 134) and the first power supply unit 151, there is provided a switch 158 for starting and suspending the power supply to the CPU 131, the ROM 132, and the HDD 134.

Between the printer unit 105 and the third power supply unit 153, there is provided a switch 159 for starting and suspending the power supply to the printer unit 105. Between the scanner unit 104 and the third power supply unit 153, there is provided a switch 160 for starting and suspending the power supply to the scanner unit 104.

Between network I/F 138 and the first power supply unit 151, there is provided a switch 161 for starting and suspending the power supply to the network I/F 138. Between the power saving button 106c on the operation unit 106 and the first power supply unit 151, there is provided a switch 162 for starting and suspending the power supply to the power saving button 106c.

The printing apparatus 103 operates in the standby state and the power saving state which provides less power consumption than the standby state. The power saving state includes the suspend state (the first power saving state) and the sleep state (the second power saving state). As illustrated in FIG. 3, in the standby state, power is supplied to each unit of the printing apparatus 103.

Figure 4:
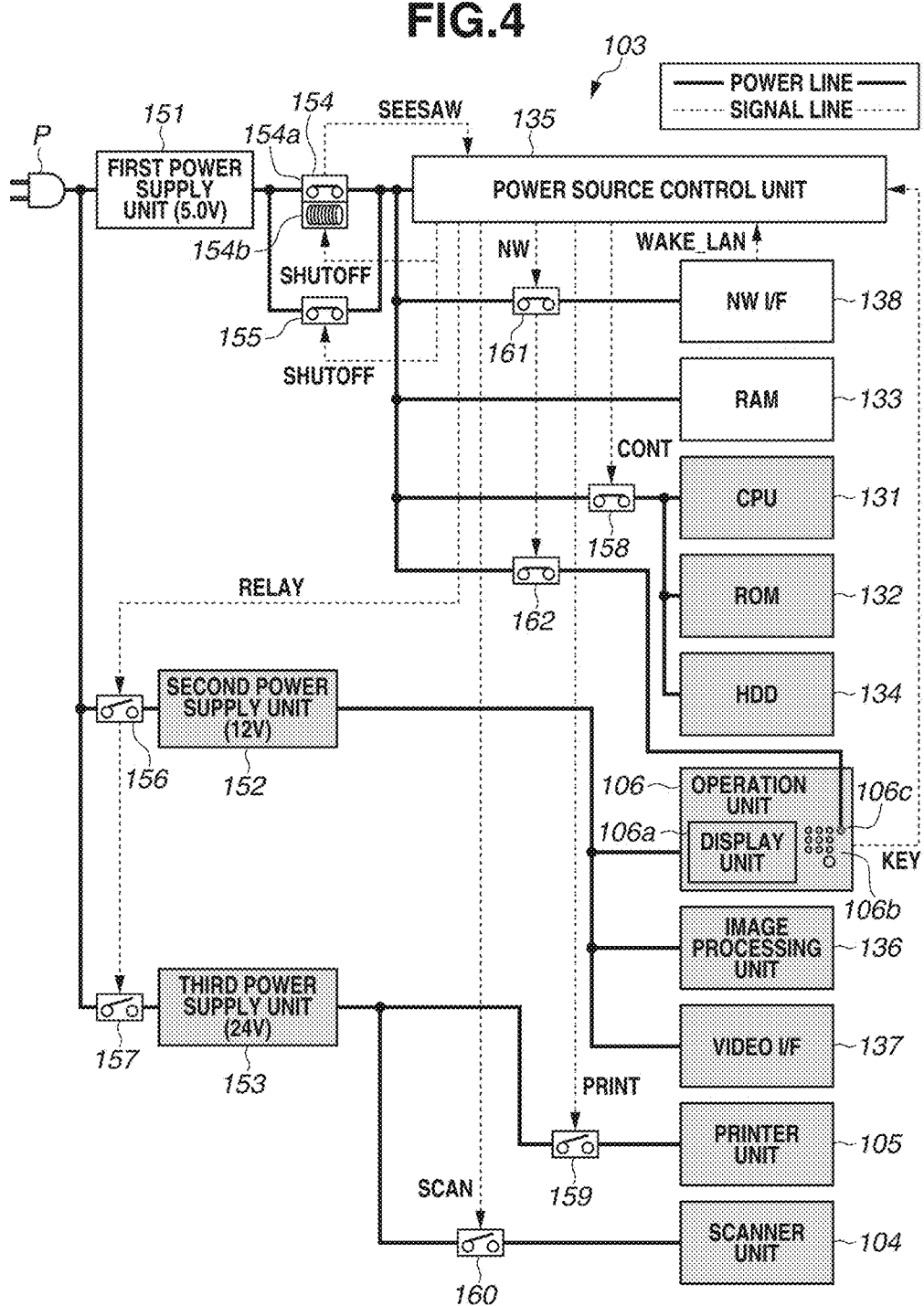
FIG. 4 illustrates the printing apparatus in a sleep state.

When the operation unit 106 has not been operated by the user for a predetermined time period and the network I/F 138 receives no packet for the above-described predetermined time period in the standby state, the printing apparatus 103 enters the sleep state, as illustrated in FIG. 4. In the sleep state, power is supplied to some of the first power source system devices (the power source control unit 135, the power saving button 106c, the network I/F 138, and the RAM 133), and power is not supplied to the remaining first power source system devices, the second power source system devices, and the third power source system devices.

In the sleep state, when the printing apparatus 103 receives raster image data or control information from the printing control apparatus 102, the printing apparatus 103 can recover to the standby state.

Figure 5:
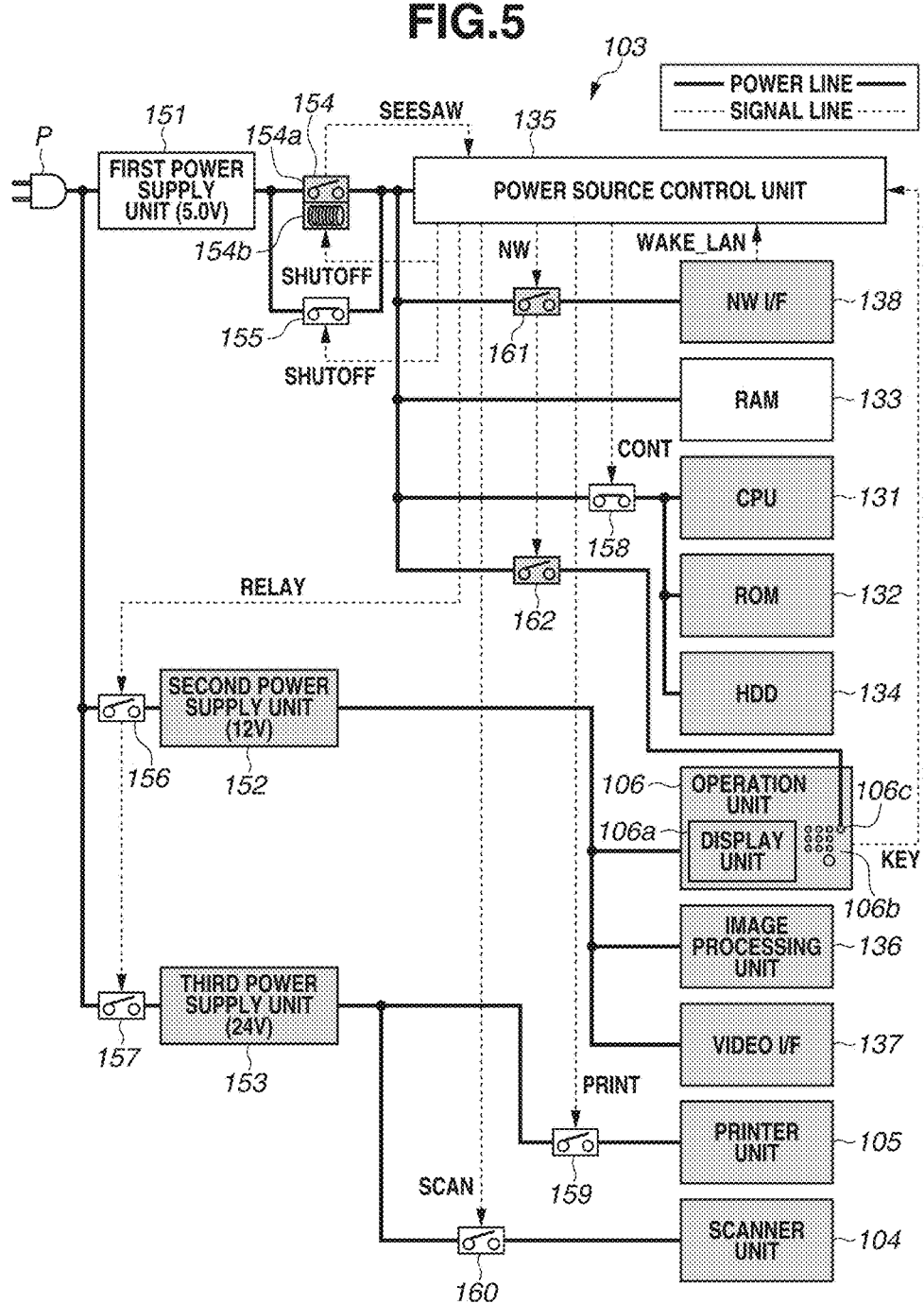
FIG. 5 illustrates the printing apparatus in a suspend state.

Further, when the seesaw switch 154a of the power switch 154 is turned OFF, the printing apparatus 103 enters the suspend state, as illustrated in FIG. 5. In the suspend state, power is supplied to some of the first power source system devices (the power source control unit 135 and the RAM 133), and power is not supplied to the remaining first power source system devices, the second power source system devices, and the third power source system devices.

In the suspend state, working statuses immediately before the printing apparatus 103 enters the suspend state are stored in the RAM 133 (main memory). In the present exemplary embodiment, the printing apparatus 103 performs reboot before entering the suspend state. Then, the state after reboot is stored in the RAM 133 as a working status. When the printing apparatus 103 recovers from the suspend state, the printing apparatus 103 can use the above-described working statuses stored in the RAM 133. Therefore, the printing apparatus 103 can start more quickly than in normal start where applications and OS are activated.

Figure 6:
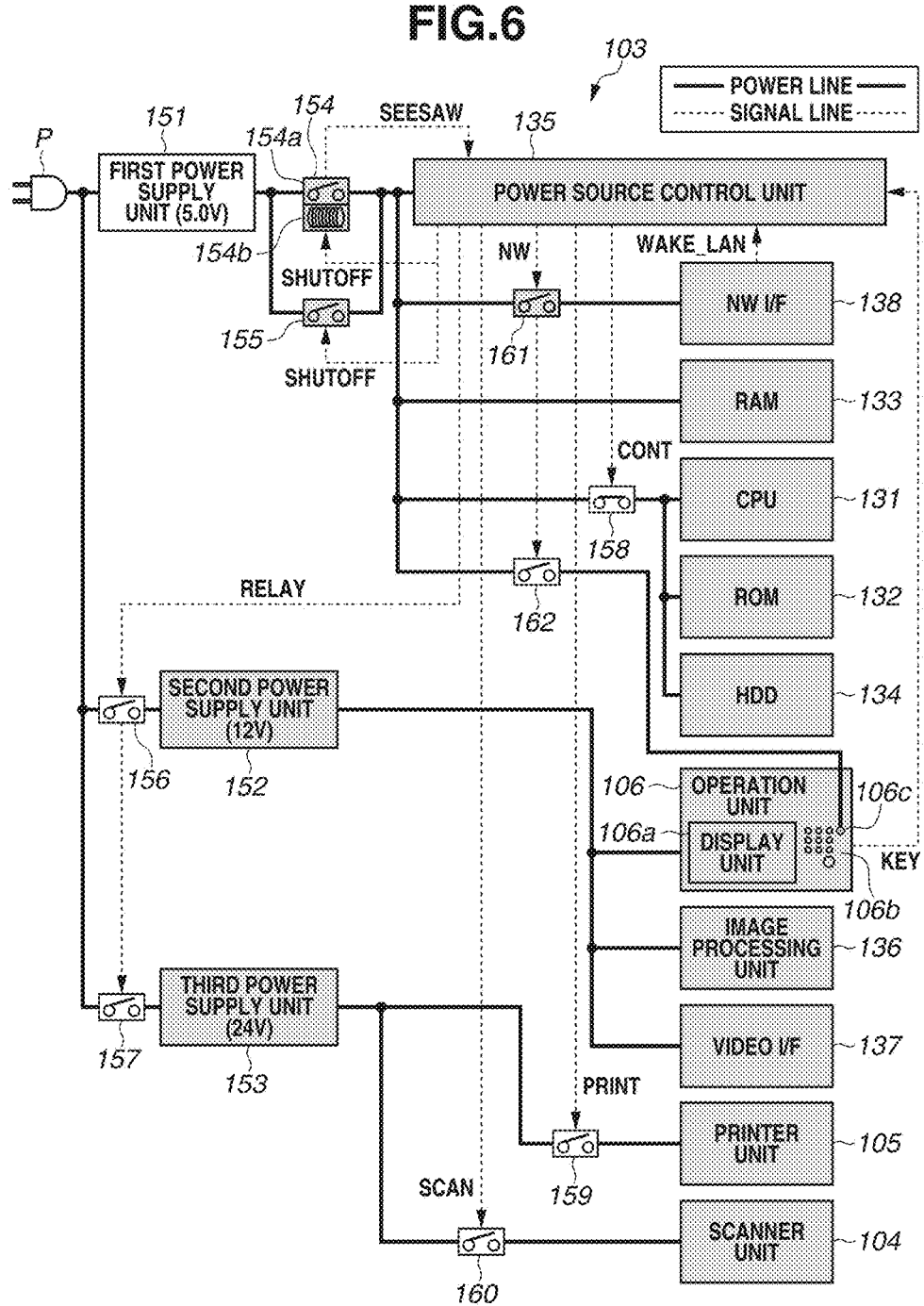
FIG. 6 illustrates the printing apparatus in a power OFF state.

When the seesaw switch 154a of the power switch 154 is turned OFF, the printing apparatus 103 does not enter the suspend state but enters the power OFF state, as illustrated in FIG. 6, under predetermined conditions. The predetermined conditions include a condition that entering the suspend state is inhibited by a user setting (when "OFF" is selected on the screen illustrated in FIG. 11) and a condition that power has not been turned OFF for a predetermined time period.

It is of course that the printing apparatus 103 may enter a power state different from the standby state and the power saving state (the sleep state and the suspend state). For example, the printing apparatus 103 may store in the HDD 134 the state immediately before turning OFF power of the printing apparatus 103 and then enter the hibernation state where, next time the printing apparatus 103 is turned ON, operations will be restarted from the state immediately before turning power OFF.

The power source control unit 135 will be described in detail below.

The power source control unit 135 is a programmable logic circuit in which the circuit is rewritable. The power source control unit 135 according to the present exemplary embodiment is a complex programmable logic device (CPLD).

The power source control unit 135 detects a recovery factor for recovering the printing apparatus 103 from the power saving state.

In the sleep state, power is supplied to the network I/F 138, the power saving button 106c on the operation unit 106, the power source control unit 135, and the RAM 133 to detect the following recovery factors, and the power supply to the other units is suspended.

A wake-up packet is received from the printing control apparatus 102.

The power saving button 106c is pressed by the user.

In the suspend state, power is supplied to the power source control unit 135 and the RAM 133 to detect the following recovery factor, and the power supply to the other units is suspended.

The seesaw switch 154a of the power switch 154 is turned ON.

When the network I/F 138 receives a wake-up packet, a recovery signal WAKE_LAN input to the power source control unit 135 enters the High level. When the power saving button 106c is pressed by the user, a recovery signal KEY input to the power source control unit 135 enters the High level.

When the recovery signal WAKE_LAN or the recovery signal KEY enters the High level while the printing apparatus 103 is in the sleep state, the power source control unit 135 causes signals CONT, PRINT, SCAN, and RELAY to enter the High level. Accordingly, the switches 156 to 162 are turned ON and the printing apparatus 103 enters the standby state.

When the seesaw switch 154a of the power switch 154 turns ON, the signal SEESAW input to the power source control unit 135 enters the High level.

When the signal SEESAW enters the High level while the printing apparatus 103 is in the suspend state, the power source control unit 135 causes signals CONT, NW, PRINT, SCAN, and RELAY to enter the High level. Accordingly, the switches 156 to 162 are turned ON and the printing apparatus 103 enters the standby state.

The printing control apparatus 102 also can enter the power saving state. When the printing control apparatus 102 enters the power saving state, the power supply to the CPU 121, the memory 122, the HDD 123, and the video I/F 124 is suspended. Meanwhile, even in the power saving state, power is supplied to the internal network I/F 125 and the external network I/F 126.

When a print job is received from the client computer 101 while the printing control apparatus 102 is in the power saving state, the printing apparatus 103 recovers from the power saving state to the standby state (a state where power is supplied to each unit). In the standby state, the printing control apparatus 102 transmits to the printing apparatus 103 raster image data generated according to the received print job.

Figure 7:
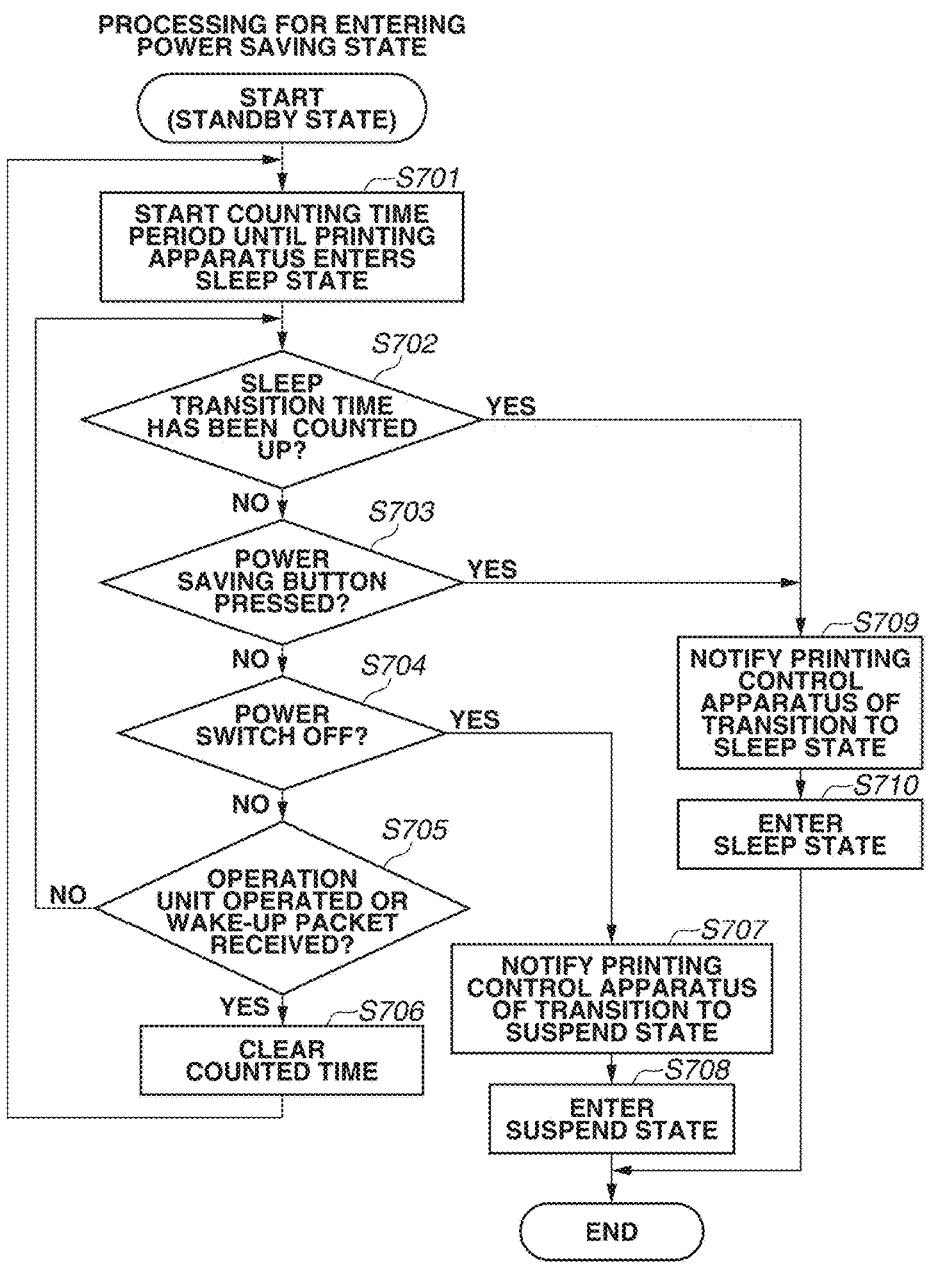
FIG. 7 is a flowchart illustrating processing performed in a case where the printing apparatus enters a power saving state.

FIG. 7 is a flowchart illustrating processing performed in a case where the printing apparatus 103 enters the power saving state. Each step of this flowchart is implemented when the CPU 131 of the printing apparatus 103 executes a program stored in a storage unit (the ROM 132 or the HDD 134).

In step S701, in the standby state, the CPU 131 starts counting the time period until the printing apparatus 103 enters the sleep state (this time period is referred to as a sleep transition time). In step S702, the CPU 131 determines whether the sleep transition time has been counted up. When the sleep transition time has been counted up (YES in step S702), then in step S709, the CPU 131 instructs the network I/F 138 to notify the printing control apparatus 102 that the printing apparatus 103 will enter the sleep state. In step S710, the CPU 131 causes the printing apparatus 103 to enter the sleep state.

On the other hand, when the sleep transition time has not been counted up (NO in step S702), then in step S703, the CPU 131 determines whether the power saving button 106c is pressed. When the power saving button 106c is pressed (YES in step S703), then in steps S709 and S710, the CPU 131 executes the above-described processing.

On the other hand, when the power saving button 106c is not pressed (NO in step S703), then in step S704, the CPU 131 determines whether the seesaw switch 154a of the power switch 154 is turned OFF. When the seesaw switch 154a is turned OFF (YES in step S704), then in step S707, the CPU 131 instructs the network I/F 138 to notify the printing control apparatus 102 that the printing apparatus 103 will enter the suspend state. In step S708, the CPU 131 causes the printing apparatus 103 to enter the suspend state.

On the other hand, when the seesaw switch 154a is not turned OFF (NO in step S704), then in step S705, the CPU 131 determines whether the operation unit 106 is operated or whether a wake-up packet is received. When the operation unit 106 is operated or a wake-up packet is received (YES in step S705), then in step S706, the CPU 131 clears the counted time. On the other hand, when neither the operation unit 106 is operated nor a wake-up packet is received (NO in step S705), then in step S702, the CPU 131 continues counting the sleep transition time.

Figure 8:
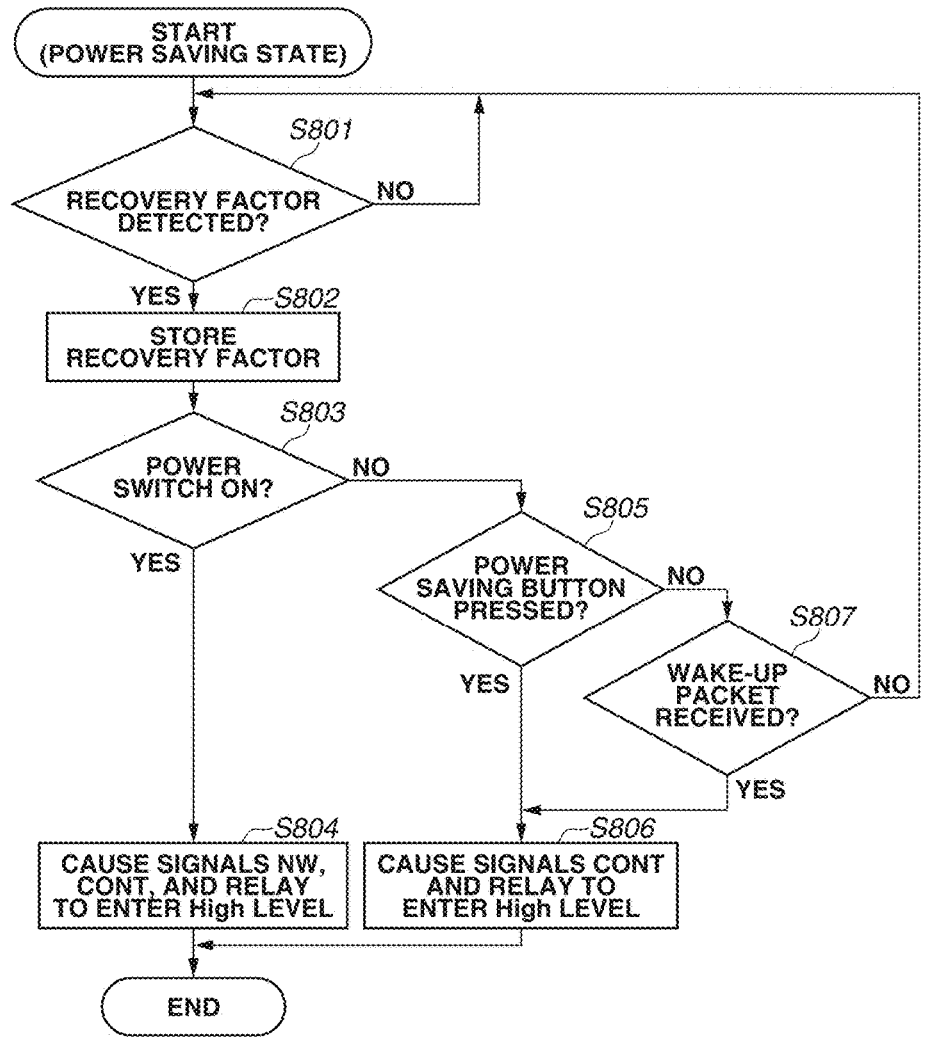
FIG. 8 is a flowchart illustrating processing performed by a power source control unit which has detected a recovery factor.

FIG. 8 is a flowchart illustrating processing performed in a case where the printing apparatus 103 recovers from the power saving state (the suspend state or the sleep state). Each step of this flowchart is executed by the power source control unit 135 of the printing apparatus 103.

In step S801, in the power saving state, the power source control unit 135 determines whether a recovery factor is detected. When a recovery factor is detected (YES in step S801), then in step S802, the power source control unit 135 stores the relevant recovery factor. When the detected recovery factor is the ON state of the seesaw switch 154a, i.e., the signal SEESAW enters the High level (YES in step S803), then in step S804, the power source control unit 135 causes the signals NW, CONT, PRINT, SCAN, and RELAY to enter the High level. Accordingly, the printing apparatus 103 enters the standby state from the suspend state.

When the detected recovery factor is the depression of the power saving button 106c, i.e., the signal KEY enters the High level (YES in step S805), then in step S806, the power source control unit 135 causes the signals CONT, PRINT, SCAN, and RELAY to enter the High level. Accordingly, the printing apparatus 103 enters the standby state from the sleep state.

When the detected recovery factor is the reception of a wake-up packet, i.e., the signal WAKE_LAN enters the High level (YES in step S807), then in step S806, the power source control unit 135 causes the signals CONT, PRINT, SCAN, and RELAY to enter the High level. Accordingly, the printing apparatus 103 enters the standby state from the sleep state.

Figure 9:
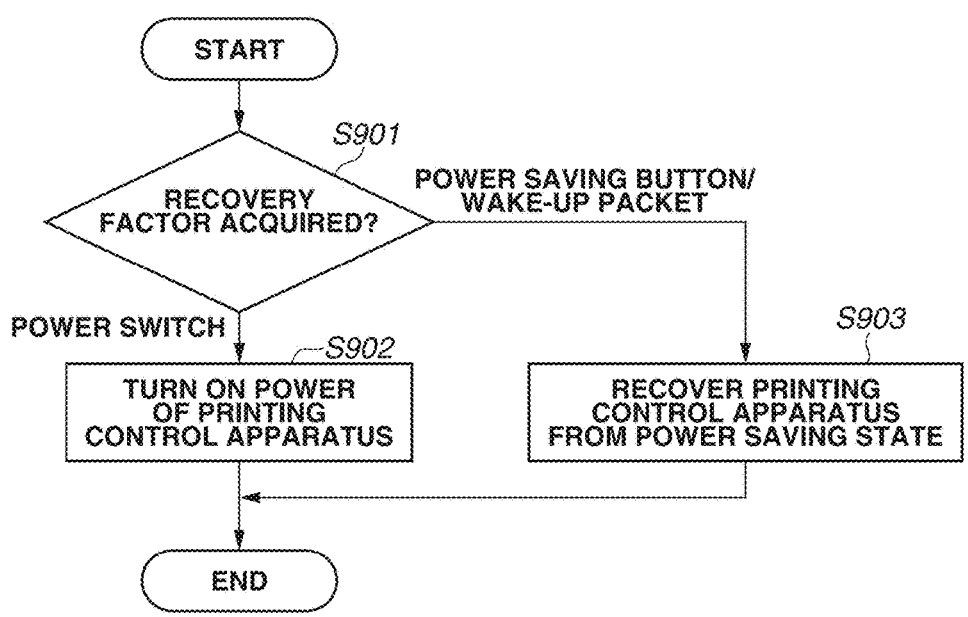
FIG. 9 is a flowchart illustrating processing performed by the printing apparatus to perform power control on the printing control apparatus.

FIG. 9 is a flowchart illustrating processing performed by the printing apparatus 103 to recover the printing control apparatus 102 from the power saving state. Each step of this flowchart is implemented when the CPU 131 executes a program stored in a storage unit (the ROM 132 or the HDD 134).

In step S901, the CPU 131 which is supplied with power reads the recovery factor stored in step S802 illustrated in FIG. 8. When the read recovery factor is the ON state of the seesaw switch 154a of the power switch 154 (Power Switch in step S901), then in step S902, the CPU 131 turns ON the power switch of the printing control apparatus 102 to cause the printing control apparatus 102 to enter the standby state from the power OFF state.

On the other hand, when the read recovery factor is the depression of the power saving button 106c or the reception of a wake-up packet (Power Saving Button/Wake-up Packet in step S901), then in step S903, the CPU 131 transmits the wake-up packet to the printing control apparatus 102 to recover the printing control apparatus 102 from the power saving state.

Figure 10:
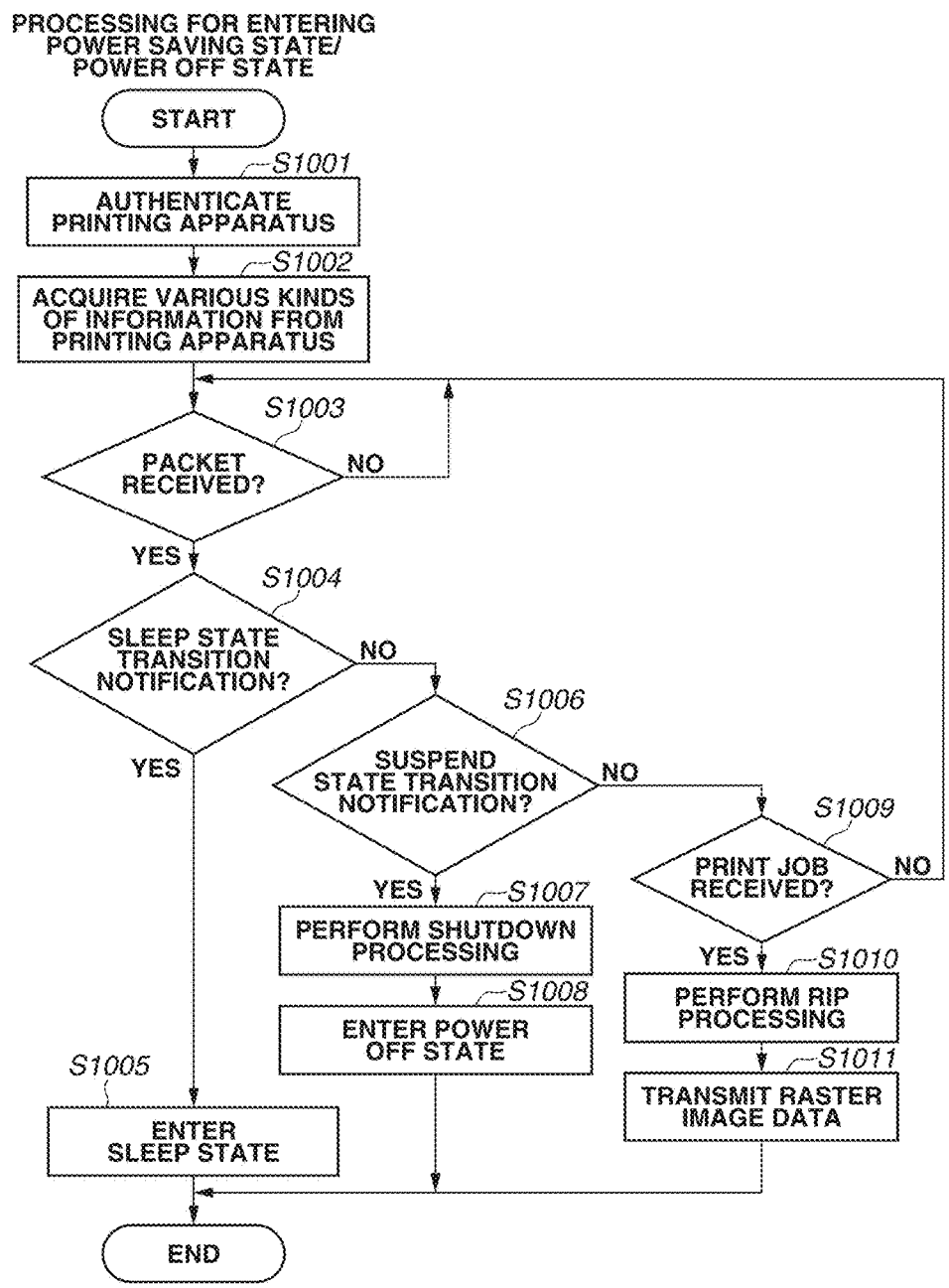
FIG. 10 is a flowchart illustrating processing performed by the printing control apparatus.

FIG. 10 is the flowchart illustrating processing performed by the printing control apparatus 102. Each step of this flowchart is executed by the CPU 121 of the printing control apparatus 102.

In step S1001, when power of the printing control apparatus 102 is turned ON, the CPU 121 authenticates the printing apparatus 103. When the authentication is successfully completed, in step S1002, the CPU 121 acquires various kinds of information of the printing apparatus 103 (configuration information for the printing apparatus 103, media information for the printing apparatus 103, residual quantity information for toner set in the printing apparatus 103, etc.).

In step S1003, the CPU 121 determines whether a packet is received from the client computer 101. When the CPU 121 determines that a packet is received (YES in step S1003), then in step S1004, the CPU 121 determines whether the relevant packet is a sleep state transition notification transmitted from the printing apparatus 103. When the sleep state transition notification is received (YES in step S1004), then in step S1005, the CPU 121 causes the printing control apparatus 102 to enter the sleep state from the standby state.

In step S1006, the CPU 121 determines whether the received packet is a suspend state transition notification transmitted from the printing apparatus 103. When the suspend state transition notification is received (YES in step S1006), then in step S1007, the CPU 121 performs shutdown processing for the printing control apparatus 102. In step S1008, the CPU 121 turns OFF power of the printing control apparatus 102.

On the other hand, when the received packet is a print job (YES in step S1009), then in step S1010, the CPU 121 performs raster image processor (RIP) processing based on the relevant print job to generate raster image data. In step S1011, the CPU 121 transmits to the printing apparatus 103 the generated raster image data and control information including commands for performing printing by using the relevant raster image data.

<Effect of First Exemplary Embodiment>

According to the above-described configuration, when the printing apparatus 103 enters the suspend state, the printing control apparatus 102 enters the power OFF state and, when the printing apparatus 103 enters the sleep state, the printing control apparatus 102 enters the power saving state. Accordingly, when the printing apparatus 103 is in the suspend state and cannot receive raster image data and control information from the printing control apparatus 102, it is possible to achieve power saving not only on the printing control apparatus 102 but also on the entire printing system 100 by causing the printing control apparatus 102 to enter the power OFF state.

Further, when the printing apparatus 103 is in the sleep state, it is possible to reduce power consumption of the entire printing system 100 by causing the printing control apparatus 102 to enter the power saving state. Further, when the printing control apparatus 102 is in the power saving state, the printing control apparatus 102, upon reception of a print job from the client computer 101, can recover from the power saving state and transmit raster image data and control information to the printing apparatus 103. This enables causing the printing apparatus 103 to recover from the power saving state according to a print job from the client computer 101.

In the above-described first exemplary embodiment, a configuration where the printing apparatus 103 enters the suspend state when the seesaw switch 154a is turned OFF is described. In a second exemplary embodiment, the user can select whether the printing apparatus 103 enters the suspend state or the power OFF state when the seesaw switch 154a is turned OFF.

FIG. 11 illustrates a screen for selecting whether quick start is enabled or disabled.

When quick start is enabled, if the user turns OFF the seesaw switch 154a, the printing apparatus 103 enters the suspend state. On the other hand, when quick start is disabled, if the user turns OFF the seesaw switch 154a, the printing apparatus 103 enters the power OFF state.

Figure 12:
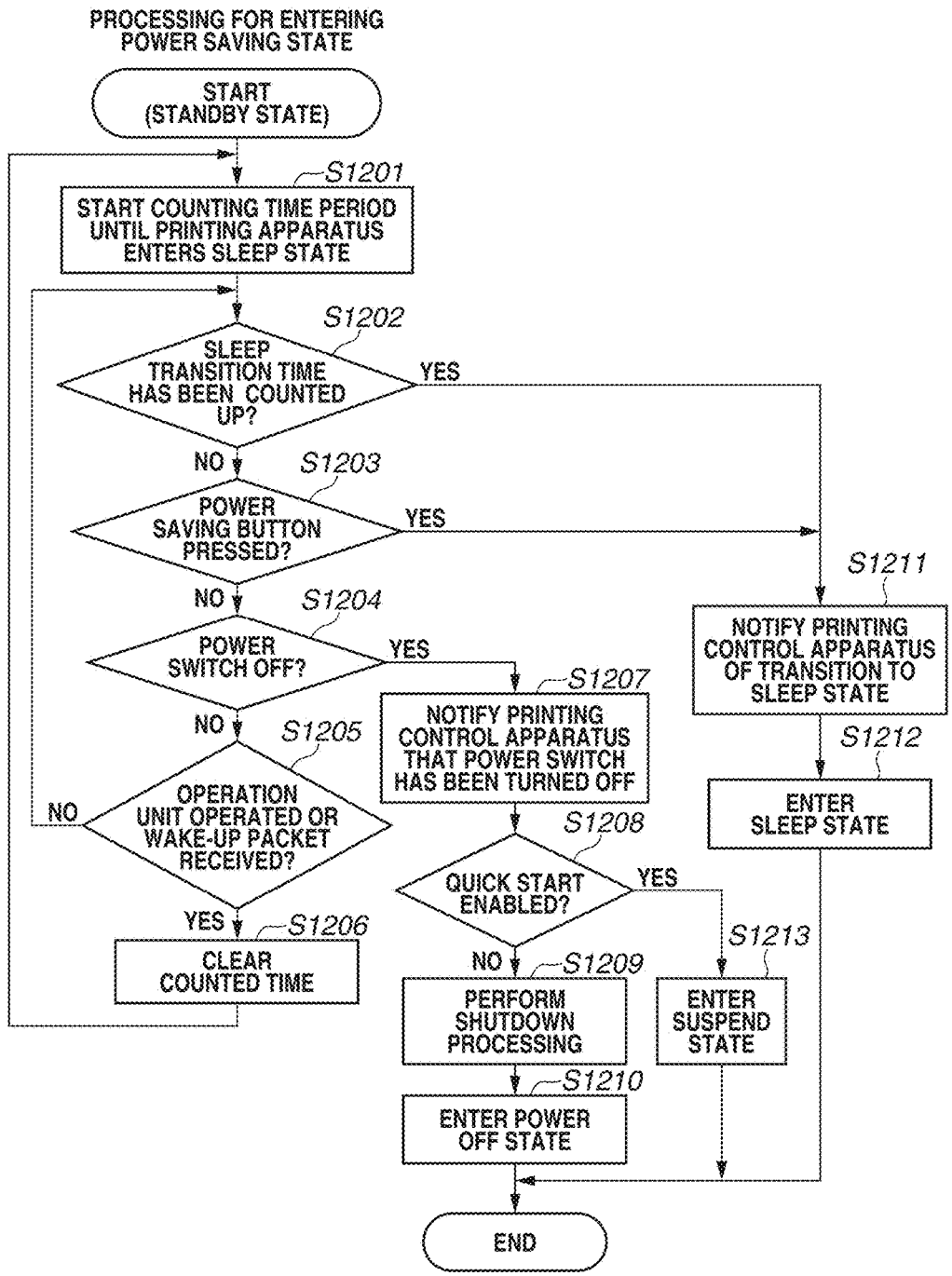
FIG. 12 is a flowchart illustrating processing performed in a case where a printing apparatus according to a second exemplary embodiment enters a power saving state.

FIG. 12 is a flowchart illustrating processing performed by the printing apparatus 103 according to the second exemplary embodiment to enter the power saving state. Each step of this flowchart is executed by the CPU 131 of the printing apparatus 103.

In step S1201, in the standby state, the CPU 131 starts counting the time period until the printing apparatus 103 enters the sleep state (this time period is referred to as a sleep transition time). In step S1202, the CPU 131 determines whether the sleep transition time has been counted up. When sleep transition time has been counted up (YES in step S1202), then in step S1211, the CPU 131 instructs the network I/F 138 to notify the printing control apparatus 102 that the printing apparatus 103 will enter the sleep state. In step S1212, the CPU 131 causes the printing apparatus 103 to enter the sleep state.

On the other hand, when the sleep transition time has not been counted up (NO in step S1202), then in step S1203, the CPU 131 determines whether the power saving button 106c is pressed. When the power saving button 106c is pressed (YES in step S1203), then in steps S1211 and S1212, the CPU 131 performs the above-described processing.

On the other hand, when the power saving button 106c is not pressed (NO in step S1203), then in step S1204, the CPU 131 determines whether the seesaw switch 154a of the power switch 154 turns OFF. When the seesaw switch 154a turns OFF (YES in step S1204), then in step S1207, the CPU 131 instructs the network I/F 138 to notify the printing control apparatus 102 that the power switch 154 has been turned OFF.

In the second exemplary embodiment, after the CPU 131 instructs the network I/F 138 to notify the printing control apparatus 102 that the power switch 154 has been turned OFF, then in step S1208, the CPU 131 determines whether quick start is enabled. Quick start is set to be enabled or disabled from the screen illustrated in FIG. 11. When quick start is disabled (NO in step S1208), then in step S1209, the CPU 131 performs shutdown processing for the printing apparatus 103. The shutdown processing includes closing a file, ending an application program, disconnecting communication with various input/output devices, and ending the OS. In step S1210, the printing apparatus 103 enters the power OFF state.

On the other hand, when quick start is enabled (YES in step S1208), then in step S1213, the CPU 131 causes the printing apparatus 103 to enter the suspend state.

On the other hand, when the seesaw switch 154a is not turned OFF (NO in step S1204), then in step S1205, the CPU 131 determines whether the operation unit 106 is operated or whether a wake-up packet is received. When the operation unit 106 is operated or a wake-up packet is received (YES in step S1205), then in step S1206, the CPU 131 clears the counted time. On the other hand, when neither the operation unit 106 is operated nor a wake-up packet is received (NO in step S1205), then in step S1202, the CPU 131 continues counting the sleep transition time.

Figure 13:
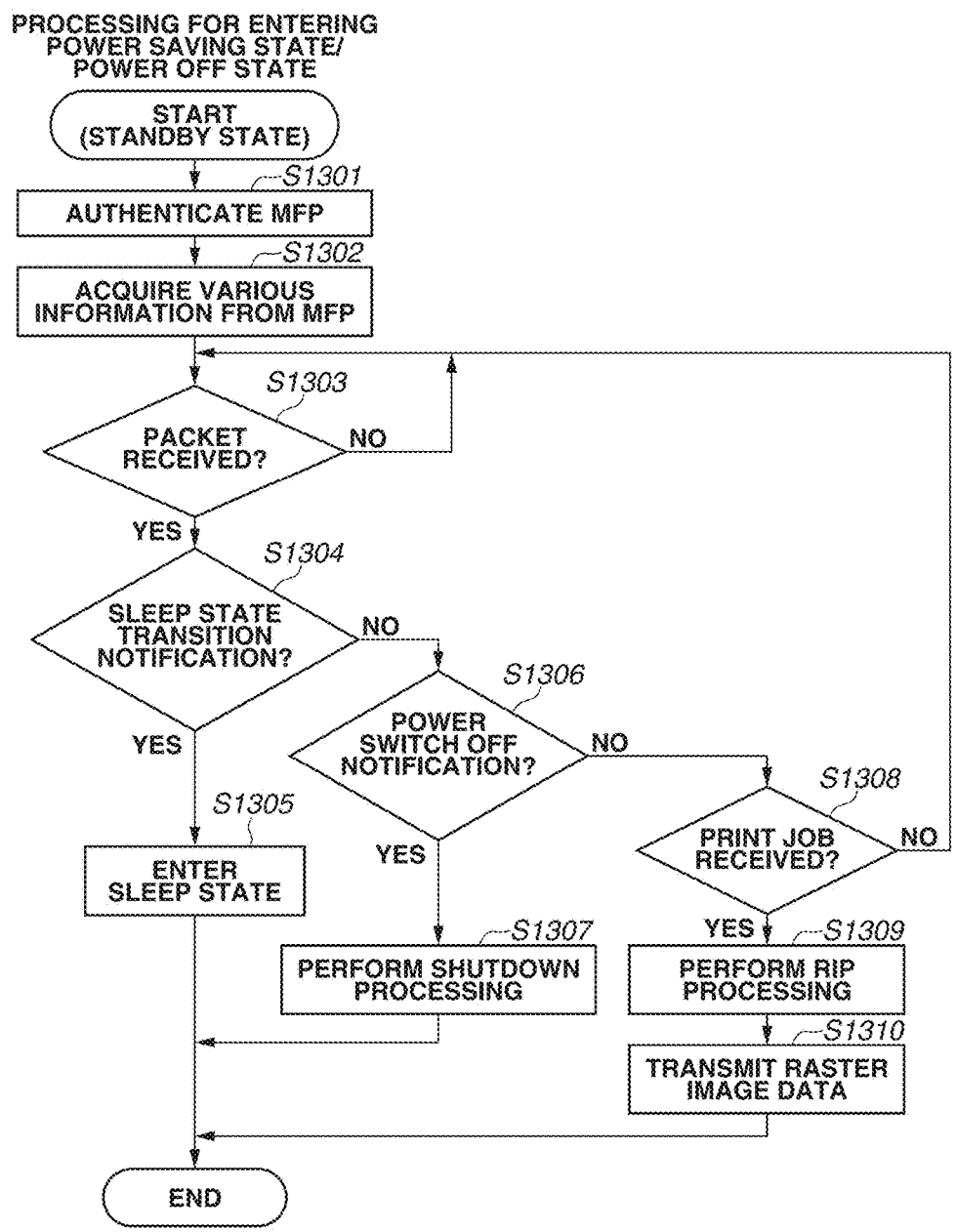
FIG. 13 is a flowchart illustrating processing performed by a printing control apparatus according to the second exemplary embodiment.

FIG. 13 is a flowchart illustrating operations of the printing control apparatus 102. Each step of this flowchart is executed by the CPU 121 of the printing control apparatus 102.

In step S1301, when the power of the printing control apparatus 102 is turned ON, the CPU 121 authenticates the printing apparatus 103. When authentication is successfully completed, in step S1302, the CPU 121 acquires various kinds of information of the printing apparatus 103 (configuration information for the printing apparatus 103, media information for the printing apparatus 103, residual quantity information for toner set in the printing apparatus 103, etc.).

In step S1303, the CPU 121 determines whether a packet is received from the client computer 101. When the CPU 121 determines that a packet is received (YES in step S1303), then in step S1304, the CPU 121 determines whether the relevant packet is a sleep state transition notification transmitted from the printing apparatus 103. When the sleep state transition notification is received (YES in step S1304), then in step S1305, the CPU 121 causes the printing control apparatus 102 to enter the sleep state from the standby state.

In step S1306, the CPU 121 determines whether the received packet is a notification transmitted from the printing apparatus 103 to notify the printing control apparatus 102 that the power switch 154 has been turned OFF. When the received packet is a notification for notifying the printing control apparatus 102 that the power switch 154 has been turned OFF (YES in step S1306), then in step S1307, the CPU 121 performs shutdown processing for the printing control apparatus 102. Then, the CPU 121 turns OFF the printing control apparatus 102.

When the received packet is a print job (YES in step S1308), then in step S1309, the CPU 121 performs RIP processing based on the relevant print job to generate raster image data. In step S1310, the CPU 121 transmits the generated raster image data and the control information to the printing apparatus 103.

In the first and the second exemplary embodiments, the configurations of changing the power states of the printing apparatus 103 and the printing control apparatus 102 in an associative way are described. In a third exemplary embodiment, the user can select whether the power states of the printing apparatus 103 and the printing control apparatus 102 are to be changed in an associative way.

FIG. 14 illustrates a screen for selecting whether the power states of the printing apparatus 103 and the printing control apparatus 102 are to be changed in an associative way.

When the user selects "ON" on the screen illustrated in FIG. 14, if the seesaw switch 154a of the printing apparatus 103 is turned OFF, the printing apparatus 103 enters the suspend state and, in association with this state transition, the printing control apparatus 102 enters the power OFF state. On the other hand, when the user selects "OFF" on the screen illustrated in FIG. 14, even if the seesaw switch 154a of the printing apparatus 103 is turned OFF, the printing control apparatus 102 does not enter the power OFF state.

FIG. 15 is a flowchart illustrating processing performed by the printing control apparatus 102 according to the third exemplary embodiment. Each step of this flowchart is executed by the CPU 121 of the printing control apparatus 102.

In step S1501, when the power of the printing control apparatus 102 is turned ON, the CPU 121 authenticates the printing apparatus 103. When authentication is successfully completed, in step S1502, the CPU 121 acquires various kinds of information of the printing apparatus 103 (configuration information for the printing apparatus 103, media information for the printing apparatus 103, residual quantity information for toner set in the printing apparatus 103, etc.).

In step S1503, the CPU 121 determines whether a packet is received from the client computer 101. When the CPU 121 determines that a packet is received (YES in step S1503), then in step S1504, the CPU 121 determines whether the relevant packet is a sleep state transition notification transmitted from the printing apparatus 103. When the sleep state transition notification is received (YES in step S1504), then in step S1505, the CPU 121 causes the printing control apparatus 102 to enter the sleep state from the standby state.

In step S1506, the CPU 121 determines whether the received packet is a suspend state transition notification transmitted from the printing apparatus 103. When the suspend state transition notification is received (YES in step S1506), then in step S1507, the CPU 121 determines whether the power association is to be performed in the present exemplary embodiment. Specifically, the CPU 121 makes an inquiry to the printing apparatus 103 about whether the power association is to be performed, and then acquires information about whether the power association is to be performed from the printing apparatus 103. The user selects whether the power association is to be performed on the screen illustrating in FIG. 14.

When setting is made to change the power states of the printing apparatus 103 and the printing control apparatus 102 in an associative way, i.e., when "ON" is selected on the screen illustrated in FIG. 14 (YES in step S1507), then in step S1508, the CPU 121 performs shutdown processing for the printing control apparatus 102. Then, the CPU 121 turns OFF the printing control apparatus 102.

On the other hand, setting is made not to change the power states of the printing apparatus 103 and the printing control apparatus 102 in an associative way, i.e., when "OFF" is selected on the screen illustrated in FIG. 14 (NO in step S1507), the processing returns to step S1503. In this case, the CPU 121 does not change the power state of the printing control apparatus 102.

On the other hand, when the received packet is a print job (YES in step S1510), then in step S1511, the CPU 121 performs RIP processing to generate raster image data based on the relevant print job. In step S1512, the CPU 121 transmits to the printing apparatus 103 the generated raster image data and control information including commands for performing printing by using the relevant raster image data.

Other Exemplary Embodiment

In the first, the second, and the third exemplary embodiments, the configurations where the suspend state is used as the first power saving state according to the present invention have been described, the relevant first power saving state may be the hibernation state.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system, comprising:
   an image processing apparatus that is capable of transmitting image data; and
   a printing apparatus that is different from the image processing apparatus, and is capable of printing on a basis of the image data transmitted by the image processing apparatus;
   wherein the printing apparatus includes
      a power switch that a user is capable of operating; and
      a power control unit that turns off and/or on the printing apparatus in accordance with an operation of the power switch;
   wherein the image processing apparatus includes
      a control unit that turns off and/or on the image processing apparatus; and
   a setting unit that sets whether or not to associate a power state of the image processing apparatus with a power state of the printing apparatus.

2. The system according to claim 1,
   wherein the control unit turns off the image processing apparatus in association with a power state of the printing apparatus and turns on the image processing apparatus in association with a power state of the printing apparatus, in a case where it is set by the setting unit that the power state of the image processing apparatus is to be associated with a power state of the printing apparatus.

3. The system according to claim 1,
   wherein the control unit turns off the image processing apparatus in association with a power state of the printing apparatus in a case where it is set by the setting unit that the power state of the image processing apparatus is to be associated with a power state of the printing apparatus; and
   wherein the control unit does not turn off the image processing apparatus in association with a power state of the printing apparatus in a case where it is not set by the setting unit that the power state of the image processing apparatus is to be associated with a power state of the printing apparatus.

4. The system according to claim 1,
   wherein the printing apparatus is capable of shifting into a sleep state; and wherein the control unit does not turn off the image processing apparatus in association with a power state of the printing apparatus if the printing apparatus is shifted into the sleep state regardless of a setting set by the setting unit.

5. The system according to claim 1,
wherein the setting unit sets whether or not to associate a power state of the image processing apparatus with a power state of the printing apparatus in accordance with a user selection.

6. The system according to claim 1,
wherein the image processing apparatus further includes a receiving unit that receives information that indicates a power state of the printing apparatus; and
wherein the control unit turns off the image processing apparatus in association with a power state of the printing apparatus in a case where the information received by the receiving unit indicates a predetermined power state and it is set that the power state of the image processing apparatus is to be associated with a power state of the printing apparatus.

7. The system according to claim 1,
wherein the image processing apparatus transmits the image data to the printing apparatus via a first cable; and
wherein the printing apparatus transmits a predetermined signal via a second cable that is different from the first cable,
wherein the control unit turns off the image processing apparatus in association with a power state of the printing apparatus in a case where the predetermined signal is received and it is set that the power state of the image processing apparatus is to be associated with a power state of the printing apparatus.

8. The system according to claim 1, further comprising:
a display unit that displays a selection screen for selecting whether or not to associate the power state of the image processing apparatus with a power state of the printing apparatus.

9. The system according to claim 8,
wherein the printing apparatus includes the display unit.

10. The system according to claim 1, further comprising:
a storage unit that stores information that specifies a power state into which the printing apparatus is to be shifted when the power switch is operated; and
wherein the power control unit turns off the printing apparatus in accordance with the operation of the power switch in a case where the information specifies a power off state, and suspends the printing apparatus in accordance with the operation of the power switch in a case where the information specifies a suspend state.

11. An image processing apparatus that is a different from a printing apparatus, and is capable of transmitting image data to the printing apparatus, the image processing apparatus comprising:
a control unit that turns off and/or on the image processing apparatus; and
a setting unit that sets whether or not to associate a power state of the image processing apparatus with a power state of the printing apparatus.

12. The image processing apparatus according to claim 11,
wherein the control unit turns off the image processing apparatus in association with a power state of the printing apparatus and turns on the image processing apparatus in association with a power state of the printing apparatus in a case where it is set by the setting unit that the power state of the image processing apparatus is to be associated with the printing apparatus.

13. The image processing apparatus according to claim 11,
wherein the control unit turns off the image processing apparatus in association with a power state of the printing apparatus in a case where it is set by the setting unit that the power state of the image processing apparatus is to be associated with a power state of the printing apparatus; and
wherein the control unit does not turn off the image processing apparatus in association with a power state of the printing apparatus in a case where it is not set by the setting unit that the power state of the image processing apparatus is to be associated with a power state of the printing apparatus.

14. The image processing apparatus according to claim 11,
wherein the printing apparatus is capable of shifting into a sleep state; and
wherein the control unit does not turn off the image processing apparatus in association with a power state of the printing apparatus if the printing apparatus is shifted into the sleep state regardless of a setting set by the setting unit.

15. The image processing apparatus according to claim 11, further comprising:
a receiving unit that receives information that indicates a power state of the printing apparatus; and
wherein the control unit turns off the image processing apparatus in association with a power state of the printing apparatus in a case where the information received by the receiving unit indicates a predetermined power state and it is set that the power state of the image processing apparatus is to be associated with the printing apparatus.

16. The image processing apparatus according to claim 11,
wherein the image processing apparatus transmits the image data to the printing apparatus via a first cable; and
wherein the image processing apparatus receives a predetermined signal via a second cable that is different from the first cable,
wherein the control unit turns off the image processing apparatus in association with a power state of the printing apparatus in a case where the predetermined signal is received and it is set that the power state of the image processing apparatus is to be associated with a power state of the printing apparatus.

17. A power control method for a system that includes an image processing apparatus that is capable of transmitting image data and a printing apparatus that is different from the image processing apparatus, the printing apparatus being capable of printing on a basis of the image data transmitted by the image processing apparatus, the method comprising:
turning off and/or on the printing apparatus in accordance with an operation of a power switch of the printing apparatus;
turning off and/or on the image processing apparatus; and
setting whether or not to associate a power state of the image processing apparatus with a power state of the printing apparatus.

18. The power control method according to claim 17,
wherein the turning off the image processing apparatus in accordance with a power state of the printing apparatus and the turning on the image processing apparatus in accordance with a power state of the printing apparatus are executed, in a case where it is set in the setting that the power state of the image processing apparatus is to be associated with a power state of the printing apparatus.

19. The power control method according to claim 17, wherein the turning off the image processing apparatus is executed in a case where it is set in the setting that the power state of the image processing apparatus is to be associated with the printing apparatus, and the turning off the image processing apparatus is not executed in a case where it is not set in the setting that the power state of the image processing apparatus is to be associated with the printing apparatus.

20. The power control method according to claim 17, further comprising:
shifting a power state of the printing apparatus into a sleep state; and
wherein, regardless of a setting set in the setting, the turning off the image processing apparatus is not executed if the power state of the printing apparatus is shifted into the sleep state.

21. The power control method according to claim 17, further comprising:
receiving information that indicates a power state of the printing apparatus; and
wherein the turning off the image processing apparatus is executed in a case where the received information indicates a predetermined power state and it is set in the setting that the power state of the image processing apparatus is to be associated with a power state of the printing apparatus.

22. The power control method according to claim 17, further comprising:
transmitting, to the printing apparatus, the image data to the printing apparatus via a first cable; and
transmitting, to the image processing apparatus, a predetermined signal via a second cable that is different from the first cable,
wherein the turning off the image processing apparatus is executed in a case where the predetermined signal is received and it is set in the setting that the power state of the image processing apparatus is to be associated with a power state of the printing apparatus.

23. The power control method according to claim 17, further comprising:
displaying a selection screen for selecting whether or not to associate the power state of the image processing apparatus with a power state of the printing apparatus.

24. The power control method according to claim 17, further comprising:
storing information that specifies a power state into which the printing apparatus is to be shifted when the power switch is operated; and
wherein the turning off the printing apparatus is executed in a case where the stored information specifies an off state is stored.

25. A system comprising:
an image processing apparatus that is capable of transmitting image data; and
a printing apparatus that is different from the image processing apparatus, and is capable of printing on a basis of the image data transmitted by the image processing apparatus;
wherein the printing apparatus includes
a power switch that a user is capable of operating; and
a power control unit that turns off the printing apparatus in accordance with an operation of the power switch;
wherein the image processing apparatus includes
a control unit that turns off the image processing apparatus in association with a power state of the printing apparatus based on a predetermined user setting.

26. The system according to claim 25,
wherein the control unit turns off the image processing apparatus in association with a power state of the printing apparatus and turns on the image processing apparatus in association with a power state of the printing apparatus, based on the predetermined user setting.

27. The system according to claim 25,
wherein the control unit turns off the image processing apparatus in association with a power state of the printing apparatus based on the predetermined user setting; and
wherein the control unit does not turn off the image processing apparatus in association with a power state of the printing apparatus based on an another user setting.

28. The system according to claim 25,
wherein the printing apparatus is capable of shifting into a sleep state; and
wherein the control unit does not turn off the image processing apparatus in association with a power state of the printing apparatus if the printing apparatus is shifted into the sleep state regardless of the predetermined user setting.

29. The system according to claim 25,
wherein the image processing apparatus further includes a receiving unit that receives information that indicates a power state of the printing apparatus; and
wherein the control unit turns off the image processing apparatus in association with a power state of the printing apparatus based on the predetermined user setting, in a case where the information received by the receiving unit indicates a predetermined power state.

30. The system according to claim 25,
wherein the image processing apparatus transmits the image data to the printing apparatus via a first cable; and
wherein the printing apparatus transmits a predetermined signal via a second cable that is different from the first cable,
wherein the control unit turns off the image processing apparatus in association with a power state of the printing apparatus based on the predetermined user setting, in a case where the predetermined signal is received.

31. The system according to claim 25, further comprising:
a display unit that displays a selection screen for selecting the predetermined user setting.

32. The system according to claim 31,
wherein the printing apparatus includes the display unit.

33. The system according to claim 25, further comprising:
a storage unit that stores information that specifies a power state into which the printing apparatus is to be shifted when the power switch is operated; and
wherein the power control unit turns off the printing apparatus in accordance with the operation of the power switch in a case where the information specifies a power off state, and suspends the printing apparatus in accordance with the operation of the power switch in a case where the information specifies a suspend state.

34. The system according to claim 25, wherein the predetermined user setting is a user setting to associate a power state of the image processing apparatus with a power state of the printing apparatus.

35. The system according to claim 25, wherein the predetermined user setting is a user setting to turn off the image processing apparatus in association with a power state of the printing apparatus.

36. An image processing apparatus that is a different from a printing apparatus, and is capable of transmitting image data to the printing apparatus, the image processing apparatus comprising:
   a reception unit that receives a predetermined user setting;
   a control unit that turns off the image processing apparatus in association with a power state of the printing apparatus based on the received predetermined user setting.

37. The image processing apparatus according to claim 36,
   wherein the control unit turns off the image processing apparatus in association with a power state of the printing apparatus and turns on the image processing apparatus in association with a power state of the printing apparatus, based on the received predetermined user setting.

38. The image processing apparatus according to claim 36,
   wherein the control unit turns off the image processing apparatus in association with a power state of the printing apparatus based on the received predetermined user setting; and
   wherein the control unit does not turn off the image processing apparatus in association with a power state of the printing apparatus based on a received another user setting.

39. The image processing apparatus according to claim 36,
   wherein the printing apparatus is capable of shifting into a sleep state; and
   wherein the control unit does not turn off the image processing apparatus in association with a power state of the printing apparatus if the printing apparatus is shifted into the sleep state regardless of the predetermined user setting.

40. The image processing apparatus according to claim 36, further comprising a receiving unit that receives information that indicates a power state of the printing apparatus; and
   wherein the control unit turns off the image processing apparatus in association with a power state of the printing apparatus based on the predetermined user setting, in a case where the information received by the receiving unit indicates a predetermined power state.

41. The image processing apparatus according to claim 36,
   wherein the image processing apparatus transmits the image data to the printing apparatus via a first cable; and
   wherein the printing apparatus transmits a predetermined signal via a second cable that is different from the first cable,
   wherein the control unit turns off the image processing apparatus in association with a power state of the printing apparatus based on the predetermined user setting in a case where the predetermined signal is received.

42. The image processing apparatus according to claim 36, wherein the printing apparatus has a display unit that displays a selection screen for selecting the predetermined user setting.

43. The image processing apparatus according to claim 36, wherein the predetermined user setting is a user setting to associate a power state of the image processing apparatus with a power state of the printing apparatus.

44. The image processing apparatus according to claim 36, wherein the predetermined user setting is a user setting to turn off the image processing apparatus in association with a power state of the printing apparatus.

45. A power control method for a system that includes an image processing apparatus that is capable of transmitting image data and a printing apparatus that is different from the image processing apparatus, the printing apparatus being capable of printing on a basis of the image data transmitted by the image processing apparatus, the method comprising:
   turning off the printing apparatus in accordance with an operation of a power switch of the printing apparatus;
   turning off the image processing apparatus in association with a power state of the printing apparatus based on a predetermined user setting.

46. The power control method according to claim 45,
   wherein the turning off the image processing apparatus is executed based on the predetermined user setting, and the turning off the image processing apparatus is not executed based on an another user setting.

47. The power control method according to claim 45, further comprising:
   shifting a power state of the printing apparatus into a sleep state; and
   wherein, regardless of the predetermined user setting, the turning off the image processing apparatus is not executed if the power state of the printing apparatus is shifted into the sleep state.

48. The power control method according to claim 45, further comprising:
   receiving information that indicates a power state of the printing apparatus; and
   wherein the turning off the image processing apparatus is executed based on the predetermined user setting in a case where the received information indicates a predetermined power state.

49. The power control method according to claim 45, further comprising:
   transmitting, to the printing apparatus, the image data to the printing apparatus via a first cable; and
   transmitting, to the image processing apparatus, a predetermined signal via a second cable that is different from the first cable,
   wherein the turning off the image processing apparatus is executed based on the predetermined user setting in a case where the predetermined signal is received.

50. The power control method according to claim 45, further comprising:
   displaying a selection screen for selecting the predetermined user setting.

51. The power control method according to claim 45, further comprising:
   storing information that specifies a power state into which the printing apparatus is to shift when the power switch is operated; and
   wherein the turning off the printing apparatus is executed in a case where the stored information specifies an off state is stored.

* * * * *